United States Patent [19]

Growden

[11] 4,423,790

[45] Jan. 3, 1984

[54] CULTIVATOR SHARE WITH INTERENGAGING CUTTING BLADE AND MOUNTING PORTIONS

[75] Inventor: Murray W. Growden, Gladstone, Australia

[73] Assignees: Philip A. Growden; Ina S. J. Growden; Sandra J. Lang; Robert B. Land, all of Gladstone, Australia; part interest to each

[21] Appl. No.: 329,667

[22] Filed: Dec. 11, 1981

[30] Foreign Application Priority Data

Apr. 23, 1981 [AU] Australia ............... PE8559

[51] Int. Cl.³ .................................. A01B 15/06
[52] U.S. Cl. .................................. 172/750
[58] Field of Search ............... 172/749, 750, 751, 753, 172/701.3; 403/361, 364, 375, 380, 381

[56] References Cited

U.S. PATENT DOCUMENTS

| 788,137 | 4/1905 | Huxford | 172/753 X |
|---|---|---|---|
| 2,016,578 | 10/1935 | Reynolds | 172/749 X |
| 2,020,841 | 11/1935 | Lier | 172/749 X |
| 2,050,488 | 8/1936 | Ferreyro et al. | 172/751 |
| 2,085,520 | 6/1937 | Weisel | 172/750 X |
| 2,386,424 | 10/1945 | Boots | 172/749 |
| 3,297,345 | 1/1967 | Downing, Jr. | 403/375 X |

FOREIGN PATENT DOCUMENTS 74222 10/1917 Austria ............... 403/364

Primary Examiner—Richard T. Stouffer
Attorney, Agent, or Firm—Chas. W. Rummler

[57] ABSTRACT

A share comprising a cutting blade portion and a mounting portion, and interengaging surfaces on the cutting blade and mounting portions including lands on each portion, each land engaging one surface of the other portion so as to retain the portions together as an assembly.

3 Claims, 5 Drawing Figures

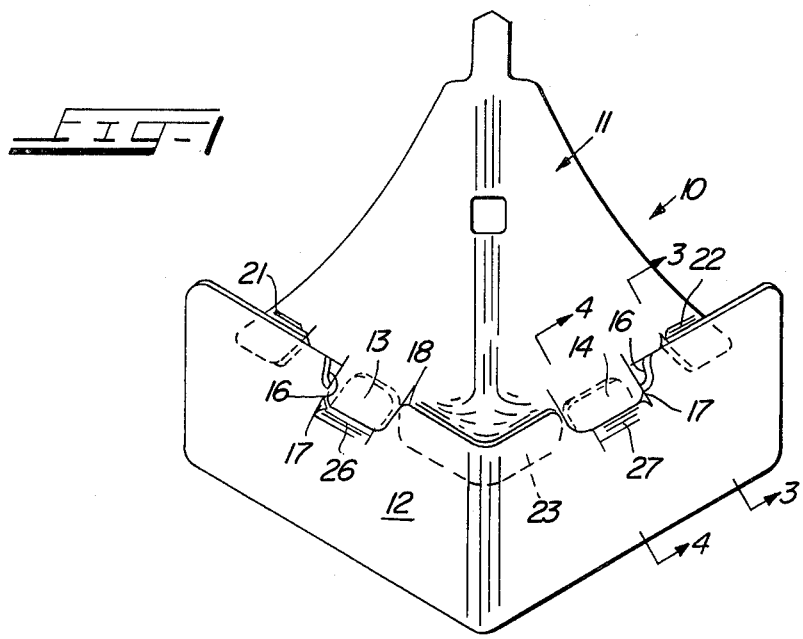
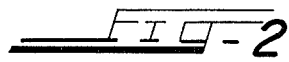
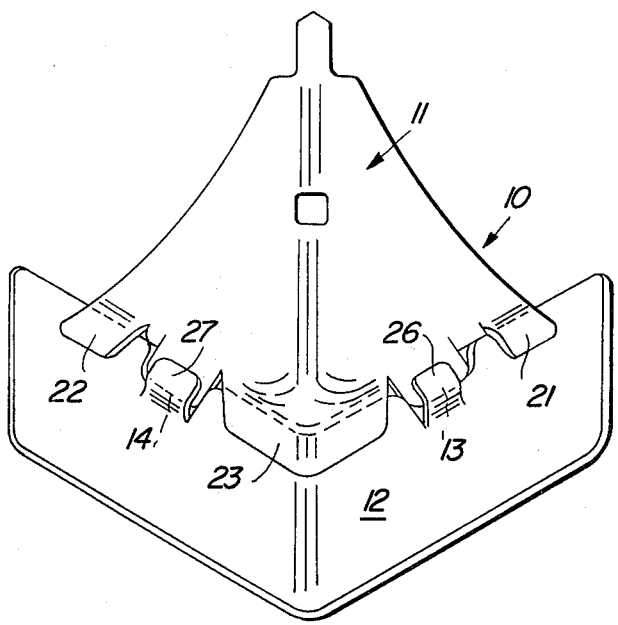

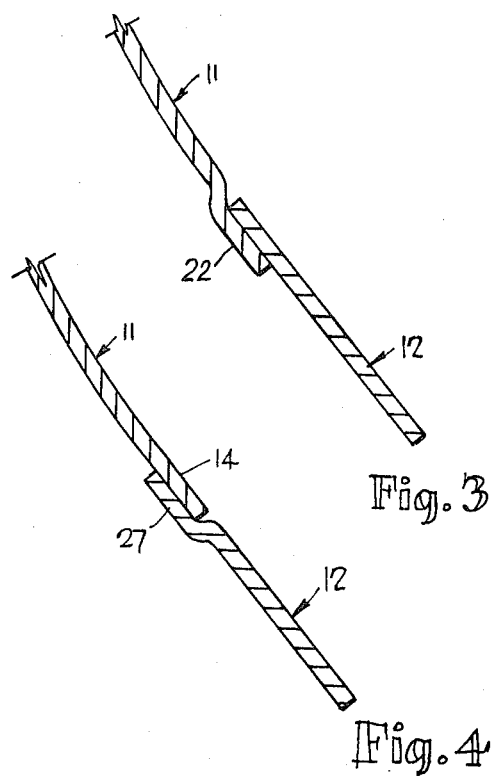

CULTIVATOR SHARE WITH INTERENGAGING CUTTING BLADE AND MOUNTING PORTIONS

This invention relates to a cultivator share (sometimes referred to as a "point") of the triangular type which is used for working soil in certain farming operations.

BACKGROUND OF THE INVENTION

Shares for cultivators and other tillage tools are used in very large numbers, and wear considerably on the cutting blade portions, but when a cutting blade portion is worn it is customary to discard the entire share. Little damage occurs to the mounting portion of a plough share, and to avoid the cost of new shares the inventor herein has experimented with welding a cutting blade to the worn part of the share. However this proved to be time consuming and difficult, and in most instances it necessitated the removal of the shares from the implement to which they are attached, and this in turn is a difficult and tedious job.

BRIEF SUMMARY OF THE INVENTION

The main object of this invention is to provide a cutting blade which can be secured to a share without welding, and in one embodiment of the invention a share comprises a cutting blade portion and a mounting portion, and interengaging surfaces on the cutting blade and mounting portions including lands or bearing areas on each portion, each land engaging against one surface of the other portion and cooperating with tongues on one portion arranged so as to retain the portions together as an assembly.

More specifically, in one aspect this invention consists of a cutting blade portion and a mounting portion, and interengaging bearing surfaces on said portions retaining said portions together as an assembly, said interengaging surfaces comprising tongues on the cutting blade portion in face to face contiguity with one surface of the mounting portion, and board bearing lands on the mounting portion in face to face contiguity with the inner surface of the cutting portion, said tongues bearing face-to-face with respective lands on the mounting portion.

BRIEF DESCRIPTION OF THE DRAWINGS

An embodiment of the invention is described hereunder in some detail with reference to and is illustrated in the accompanying drawings, in which:

FIG. 1 is a top view of a share looking toward the point of the blade portion,

FIG. 2 is an underside view of the share as seen from the back side of the blade, FIG. 3 is a section on line 3—3 of FIG. 1, drawn to an enlarged scale, FIG. 4 is a section on line 4—4 of FIG. 1, drawn to an enlarged scale.

DETAILED DESCRIPTION OF THE EMBODIMENT

Figure 5:
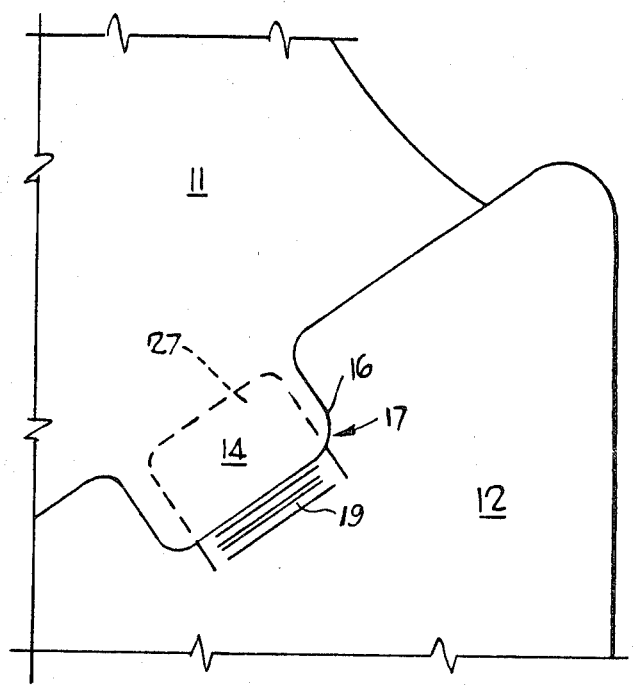
FIG. 5 is an enlarged front face view of one end of the share assembly to show the engagement of a mounting portion tongue with a preformed land on the blade.

In this embodiment a share 10 comprises two portions, one being a mounting portion 11 which is of such shape as to be secured to an implement, and the other being a cutting blade portion 12 which is arranged to be knocked on to or knocked off the mounting portion, for example, with a hammer.

The mounting portion 11 comprises a pair of forwardly projecting tongues 13 and 14, and as shown best in FIG. 6, each tongue (13 and 14) has side surfaces 16 which include a laterally projecting portion 17, while the cutting blade portion 12 is a generally V shaped member in horizontal plan which has surfaces which define respective recesses 18 and 19 into which the respective tongues are received and engaged by the side surfaces 16 and portions of the tongues 13 and 14, respectively. It is essential that the direction of slope of the share assembly be such that the cutting blade can be moved in a longitudinal direction (that is the direction of thrust by the soil when the blade is in use) and the tongues will enter the recesses, but because of the projecting portions 17, the cutting blade 12 elastically deforms and then at least partly returns to its original shape, providing a stiff "snap action" engagement which inhibits release if the share should encounter an obstruction in use (for example, a stone in the ground).

The tongues 13 and 14 of the mounting portion 11 are flanked on each side by forwardly projecting and somewhat depressed lands against which the blade bears, there being two outer lands 21 and 22 at respective sides of the portion 11, and one central land 23 formed by deformation of the point of the mounting portion 11 to lie within the point of the blade 12. The tongues 13 and 14 are located above respective rearwardly projecting and depressed lands 26 and 27 on the cutting blade 12. The lands 26 and 27 are formed by slitting and pressing of the "parent" metal so as to deform it to lie contiguous with the rear surface of the mounting portion, although this may not necessarily be the case and in some instances the lands may be small flat plates of metal separately welded in position. The interengaging surfaces between the tongues 13 and 14 and the respective depressed lands 26 and 27 of the cutting blade 12 slope in such a way as to cause a continually increasing interference as the cutting blade is driven on to the mounting portion, and the same type of interference is achieved between the forwardly projecting depressed lands 21, 22 and 23 of the mounting portion 11 and the undersurface of the cutting blade 12. With this arrangement, as the cutting blade is driven on to the end of the mounting portion, a locking effect takes place between the edge surfaces of the tongues and the recess defining surfaces of the cutting blade, and a wedging effect between the depressed lands and their contiguous face to face surfaces. This firmly locks the cutting blade to the mounting portion, and inhibits dislodgement even under quite adverse farming conditions. However, in addition to the interengagement between the edge surfaces, the front ends of the mounting portion have forwardly facing edge surfaces which will engage the rearwardly facing edge surfaces of the cutting blade in the event of both frontal and side forces being applied, thereby limiting the load imparted to the interengaging side surfaces of the recesses and side surfaces of the projecting tongues. This can be seen from FIGS. 3, and 4. Furthermore, it will be seen that with this arrangement the land portions of the assembly which result in interengagement of the parts are on the underside of the assembly and therefore not subject to abrasive wear, and the abrasive wear will take place on the faired surfaces of the cutting blade and mounting portion.

In some embodiments of the invention (not herein illustrated), the cutting blade is formed from a flat bar of metal which is of general V shape in plan, but formed to have upwardly sloping surfaces by forming an upwardly projecting central portion of the assembly, and this assists in the action of lifting and breaking the soil, and it also provides some protection for a securing bolt when such is used for the securing of the mounting portion to a tyne arm of an implement.

It will be seen that with this invention it is possible to have a range of shapes and sizes of cutting blades for any one given mounting portion, and this provides an inventory saving. Although the above-described embodiment has been limited to only two forwardly projecting tongues 13 and 14 on the mounting portion, use can be made of a larger number of tongues if this is desired for any specific application. Also, if so desired, the depressed lands 21, 22 and 23 of the portion 11 can be provided with serrated surfaces and these can be arranged to interengage other serrated surfaces on the blade portion contiguous therewith to thereby inhibit accidental dislodgement of the cutting blade. Although the tongues 13 and 14 have been described as projecting forwardly from the mounting portion 11, they can of course project rearwardly from the cutting portion and in some embodiments a central tongue secured to the cutting blade can override a central part of the forward portion of the mounting portion 12 to further protect the securing bolt. However, these and other similar variations will be seen to lie within the invention.

I claim:

1. A cultivator share of the triangular type comprising a cutting blade portion (12) and a mounting portion (11), and interengaging surfaces on said portions retaining said portions together as an assembly with the upper surfaces of the cutting blade portion (12) and mounting portion (11) merging with each other; said interengaging surfaces comprising tongues (13, 14) projecting from the mounting portion (11) and lying coplanar with the part of the mounting portion adjacent thereto; lands (21, 22 and 23) on the mounting portion (11) deformed with respect thereto so as to be contiguous with the rear surface of the cutting blade portion (12), and additional lands (26, 27) on the cutting blade portion (12) deformed with respect thereto so as to receive and be contiguous with the rear surface of the tongues (13, 14) of the mounting portion (11); said interengaging surfaces further comprising edge surfaces (16) of the tongues (13, 14) projecting from the mounting portion (11) abutting edge surfaces of respective complementary recesses (18, 19) respectively formed by the deformed lands (26, 27) in the cutting blade portion (12), each of said tongue edge surfaces (16) comprising a projecting portion (17) complementary to one of said recesses (18, 19, respectively), each of said projecting portions and its complementary recess being of such shape that, upon assembly of the cutting blade and mounting portions, the cutting blade portion elastically deforms and then at least partly returns to its original shape to engage said projecting portions thereby inhibiting release of the cutting blade from the mounting portion.

2. A cultivator share according to claim 1 wherein two said lands on the mounting portion lie to the outside of said tongues, and said lands on the cutting portion bear against the rear surfaces of respective said tongues.

3. A cultivator share according to claim 2 wherein said mounting portion comprises a third land located centrally on the share and lying in face to face contiguity with the upper rear surface of the cutting blade portion near its transverse centre.

* * * * *